(12) United States Patent
Morihashi et al.

(10) Patent No.: US 10,603,869 B2
(45) Date of Patent: Mar. 31, 2020

(54) LAMINATED STRUCTURE AND METHOD FOR MANUFACTURING THE SAME

(71) Applicant: KAWASAKI JUKOGYO KABUSHIKI KAISHA, Kobe-shi, Hyogo (JP)

(72) Inventors: Ryo Morihashi, Kobe (JP); Takeshi Hasegawa, Aioi (JP); Yosuke Tsumura, Kobe (JP); Takeshi Takagi, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 276 days.

(21) Appl. No.: 15/108,359

(22) PCT Filed: Dec. 19, 2014

(86) PCT No.: PCT/JP2014/083711
§ 371 (c)(1),
(2) Date: Jun. 27, 2016

(87) PCT Pub. No.: WO2015/098751
PCT Pub. Date: Jul. 2, 2015

(65) Prior Publication Data
US 2016/0325524 A1 Nov. 10, 2016

(30) Foreign Application Priority Data
Dec. 27, 2013 (JP) ................. 2013-270725

(51) Int. Cl.
*B32B 5/24* (2006.01)
*B32B 7/02* (2019.01)
(Continued)

(52) U.S. Cl.
CPC .......... *B32B 5/245* (2013.01); *B29D 99/0021* (2013.01); *B32B 5/18* (2013.01);
(Continued)

(58) Field of Classification Search
CPC .......... B29D 99/0021; B32B 2305/022; B32B 2307/3065; B32B 5/32; B32B 2250/04;
(Continued)

(56) References Cited

U.S. PATENT DOCUMENTS 4,889,763 A * 12/1989 Brambach ................. B32B 5/24
442/223
5,160,784 A * 11/1992 Shmidt .................... B29C 44/22
428/316.6
(Continued)

FOREIGN PATENT DOCUMENTS

JP H05-74456 B2 10/1993
JP H10-273042 A 10/1998
(Continued)

OTHER PUBLICATIONS

Mechanical Design in Optical Engineering.*
Mar. 24, 2015 International Search Report issued in International Patent Application No. PCT/JP2014/083711.

*Primary Examiner* — Prashant J Khatri
*Assistant Examiner* — Daniel P Dillon
(74) *Attorney, Agent, or Firm* — Oliff PLC (57) ABSTRACT

A laminated structure has a first layer formed from a fiber reinforced plastic, a second layer formed from a fiber reinforced plastic and arranged opposed to the first layer, a first core layer formed from a first resin foam and arranged between the first layer and the second layer, and a second core layer formed from a second resin foam and arranged between the first core later and the second layer. The first resin foam has a higher flame resistance than the second resin foam. A laminated structure having flame resistance and high strength enough to endure a bird strike or the like at the same time can be manufactured at relatively low manufacturing cost.

17 Claims, 6 Drawing Sheets

(51) Int. Cl.
| | |
|---|---|
| *B32B 27/06* | (2006.01) |
| *B32B 27/20* | (2006.01) |
| *B60R 13/00* | (2006.01) |
| *B32B 5/18* | (2006.01) |
| *B29D 99/00* | (2010.01) |
| *B32B 5/32* | (2006.01) |
| *B32B 7/04* | (2019.01) |
| *B32B 27/08* | (2006.01) |
| *B32B 27/12* | (2006.01) |
| *B32B 27/28* | (2006.01) |
| *B32B 27/30* | (2006.01) |
| *B32B 27/36* | (2006.01) |
| *B29C 65/00* | (2006.01) |
| *B29C 65/02* | (2006.01) |
| *B32B 37/04* | (2006.01) |
| *B32B 37/12* | (2006.01) |
| *B29C 65/48* | (2006.01) |
| *B29C 65/06* | (2006.01) |
| *B29K 627/06* | (2006.01) |
| *B29K 667/00* | (2006.01) |
| *B29K 679/00* | (2006.01) |
| *B29K 681/00* | (2006.01) |
| *B32B 37/14* | (2006.01) |

(52) U.S. Cl.
CPC ............. *B32B 5/32* (2013.01); *B32B 7/02* (2013.01); *B32B 7/04* (2013.01); *B32B 27/065* (2013.01); *B32B 27/08* (2013.01); *B32B 27/12* (2013.01); *B32B 27/20* (2013.01); *B32B 27/28* (2013.01); *B32B 27/281* (2013.01); *B32B 27/285* (2013.01); *B32B 27/304* (2013.01); *B32B 27/36* (2013.01); *B60R 13/00* (2013.01); *B29C 65/02* (2013.01); *B29C 65/06* (2013.01); *B29C 65/48* (2013.01); *B29C 65/4895* (2013.01); *B29C 66/1122* (2013.01); *B29C 66/45* (2013.01); *B29C 66/712* (2013.01); *B29C 66/721* (2013.01); *B29C 66/727* (2013.01); *B29C 66/7394* (2013.01); *B29K 2627/06* (2013.01); *B29K 2667/003* (2013.01); *B29K 2679/085* (2013.01); *B29K 2681/06* (2013.01); *B29K 2995/0016* (2013.01); *B32B 37/04* (2013.01); *B32B 37/12* (2013.01); *B32B 37/144* (2013.01); *B32B 2250/04* (2013.01); *B32B 2250/24* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2266/0214* (2013.01); *B32B 2266/0235* (2013.01); *B32B 2266/0242* (2013.01); *B32B 2266/0264* (2013.01); *B32B 2266/0285* (2013.01); *B32B 2305/022* (2013.01); *B32B 2305/08* (2013.01); *B32B 2307/3065* (2013.01); *B32B 2307/54* (2013.01); *B32B 2307/558* (2013.01); *B32B 2309/105* (2013.01); *B32B 2605/00* (2013.01); *B32B 2605/08* (2013.01); *B32B 2605/10* (2013.01); *B32B 2605/18* (2013.01); *B32B 2607/00* (2013.01)

(58) Field of Classification Search
CPC ........... B32B 5/18; B32B 7/02; B32B 37/144; B32B 2260/021; B32B 27/065; B29K 2995/0016; B29C 66/70–73; B29C 44/22
USPC .................................................. 428/212–220
See application file for complete search history.

(56) References Cited

U.S. PATENT DOCUMENTS

| | | | |
|---|---|---|---|
| 2009/0220762 A1* | 9/2009 | Hansel | B29C 44/1285 428/304.4 |
| 2013/0273341 A1* | 10/2013 | Albertelli | B32B 5/18 428/218 |

FOREIGN PATENT DOCUMENTS

| | | |
|---|---|---|
| JP | H11-254567 A | 9/1999 |
| JP | 2006-347134 A | 12/2006 |

* cited by examiner

LAMINATED STRUCTURE AND METHOD FOR MANUFACTURING THE SAME

TECHNICAL FIELD

The present invention relates to a laminated structure configured by laminating a layer formed from a fiber reinforced plastic and a layer formed from a resin foam and a method for manufacturing the same.

BACKGROUND ART

Conventionally, a Fiber Reinforced Plastic (FRP), which is a material made by reinforcing resin with fibers such as a carbon fiber and a glass fiber is broadly applicable to aircrafts, railroads, automobiles, and the like, because of its higher strength and lower weight compared to metals. As a resin for manufacturing a high-strength FRP, typically a thermosetting resin is used.

FRP is manufactured by various methods. For example, high-quality Carbon Fiber Reinforced Plastic (CFRP) components used for aircrafts are manufactured by autoclave molding using prepreg.

Also, there are RTM (Resin Transfer Molding) that fibers are arranged in a mold cavity and resin is pressed thereinto, and VaRTM (Vacuum Assisted Resin Transfer Molding) that injection pressure is performed only by a vacuum pressure. The rest are a hand lay-up method and a spray-up method as manufacturing methods for small-lot production of wider-ranging products, and SMC (Sheet Molding Compound) as a manufacturing method for mass production.

FRP has a feature that it not only has higher strength and lower weight compared to metals but also can realize a complicated shape relatively easily. This is because a mold is used when molding FRP, and an aerodynamically excellent shape can be easily applied to a molded article by the die.

A typical example that FRP is applied is a case that a front bodyshell of a front car of an high-speed railcar is manufactured with FRP. When the front bodyshell of the front car is manufactured not with FRP but with metal materials, an external plate such as a bent aluminum plate is welded on a frame assembled in a grid shape by welding. At this time, it is difficult to obtain a predetermined shape due to a thermal deformation in welding. Although there is also a method of cutting and shaping the front bodyshell from a block material such as aluminum by machining, material loss becomes large. In contrast, when using FRP, as a complicated shape is easily molded using the mold as mentioned above, manufacturing cost can be reduced.

Figure 7:
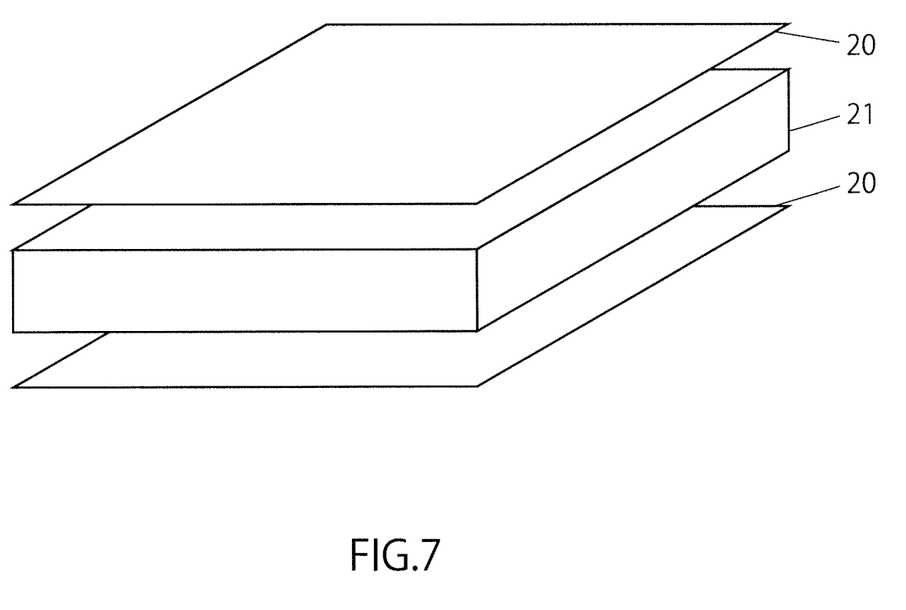
FIG. 7 is an exploded perspective view for illustrating a conventional laminated structure.

Also, when a desired rigidity cannot be obtained with a single FRP, a sandwich structure that a FRP 20 is laminated on a core material 21 is made as illustrated in FIG. 7. Typically, a honeycomb core or a resin foam can be given as the core material 21. As the front bodyshell of the front car of the high-speed railcar to which the above-mentioned FRP is applied is required to be light and highly rigid, it has a sandwich structure. While travelling, birds or the like collide with the front bodyshell of the front car and the honeycomb core leads to compression (buckling) failure. Therefore, a resin foam (foamed core material) is used as a core material (see PTL 1). However, the foamed core material is required not to break due to an external force by the load upon a bird strike.

CITATION LIST

Patent Literature

[PTL 1] Japanese Patent Application Laid-Open No. H10-273042

SUMMARY OF INVENTION

Technical Problem

Note that, the front bodyshell of the front car of the high-speed railcar is required to have enough strength to endure the bird strike or the like as mentioned above, in addition to that, flame resistance (burning resistance) is also required so that ignition, inflammation, smoke, toxic gas, or the like does not occur easily even when exposed to flame or heat from the surroundings.

However, in applying a laminated structure formed by laminating FRP and the resin foam to the front bodyshell of the front car, an attempt to have the laminated structure itself have the flame resistance in addition to the strength enough to endure the bird strike or the like has not been made sufficiently so far.

Here, a resin foam including all of the sufficient strength capable of enduring the bird strike or the like, the flame resistance, and the lightness does not exist so far.

There is a relatively inexpensive resin foam which is a little inferior in strength but excellent in flame resistance. However, when the whole foamed core material of the laminated structure is to be formed from the resin foam, it is necessary to make the thickness of the foamed core material thick in order to ensure a desired strength. Accordingly, the thickness of the whole laminated structure increases, and there occurs a problem that it is difficult to follow along a curved surface, and weight and cost increase.

Note that a structural member requiring the flame resistance in addition to a suitable strength is not always limited to the front bodyshell of the front car of the high-speed railcar, and structural members of transporting means other than railcars and building structures or the like also can be targets.

Therefore, an object of the present invention is that a laminated structure having the flame resistance and the strength enough to endure the bird strike or the like at the same time can be manufactured at relatively low manufacturing cost.

Solution to Problem

In order to achieve the object above, a laminated structure according to the present invention comprises a first layer formed from a fiber reinforced plastic, a second layer formed from a fiber reinforced plastic and arranged opposed to the first layer, a first core layer formed from a first resin foam and arranged between the first layer and the second layer, and a second core layer formed from a second resin foam and arranged between the first core later and the second layer, wherein the first resin foam has a higher flame resistance than the second resin foam.

Also, it is preferable that the second resin foam has a higher strength than the first resin foam.

Also, it is preferable that a thickness of the second core layer is thicker than a thickness of the first core layer.

Also, it is preferable that the first core layer and the second core layer are joined.

Also, it is preferable that the first core layer and the second core layer are joined by any one of bonding, welding, fusing, or any combination thereof.

Also, it is preferable that the first layer and the first core later are joined by a part of resin forming the first layer.

Also, it is preferable that the second layer and the second core layer are joined by a part of resin forming the second layer.

Also, it is preferable that a third core layer formed from a resin foam which has a higher flame resistance than the second resin foam is arranged between the second core layer and the second layer.

Also, it is preferable that the second core layer and the third core layer are joined.

Also, it is preferable that the second core layer and the third core layer are joined by any one of bonding, welding, fusing, or any combination thereof.

Also, it is preferable that the second layer and the third core layer are joined by a part of resin forming the second layer.

Also, it is preferable that the first resin foam is formed from any one of polyethylene terephthalate, phenol resin, or polyether sulfone.

Also, it is preferable that the second resin foam is formed from any one of polyvinyl chloride, polymethacrylimide, polyimide, or polyetherimide.

Also, it is preferable that the laminated structure is used as a structural member forming at least a part of a front bodyshell of a front car of a railway vehicle.

Also, it is preferable that the fiber reinforced plastic is formed using a thermosetting resin.

In order to achieve the objects, the present invention comprises the steps of, in a manufacturing method of a laminated structure, forming a first core member from a first resin foam, forming a second core member from a second resin foam, forming a core member assembly by laminating the first core member and the second core member, laminating a reinforcing fiber for forming a first FRP layer on a mold, making the first core member side of the core member assembly opposite to a surface of the reinforcing fiber for forming the first FRP layer so as to be laminated on the same surface, and laminating a reinforcing fiber for forming a second FRP layer on the second core member side of the core member assembly, wherein the first resin foam has a higher flame resistance than the second resin foam.

Also, it is preferable that the second resin foam has a higher strength than the first resin foam.

Also, it is preferable that a step of forming a third core member between the second core member and the second layer is further provided.

Also, it is preferable that the first layer and the second layer, and a core member adjacent to the layers are joined by a part of resin forming each of the first layer and the second layer.

Also, it is preferable that the fiber reinforced plastic is formed using a thermosetting resin.

Advantageous Effect of Invention

According to the present invention, a laminated structure having flame resistance and high strength enough to endure the bird strike or the like at the same time can be manufactured at relatively low manufacturing cost.

DESCRIPTION OF EMBODIMENTS

Hereunder, a laminated structure according to an embodiment of the present invention will be described referring to the figures.

The laminated structure according to the embodiment is particularly suitable for a structural member of a front bodyshell of a front car of a high-speed railcar. However, the present invention is not only applicable to the front bodyshell of the front car of the high-speed railcar, but also applicable to structural members of a side bodyshell, roof bodyshell, and an end body shell of the high-speed railcar and a general railcar.

Figure 1:
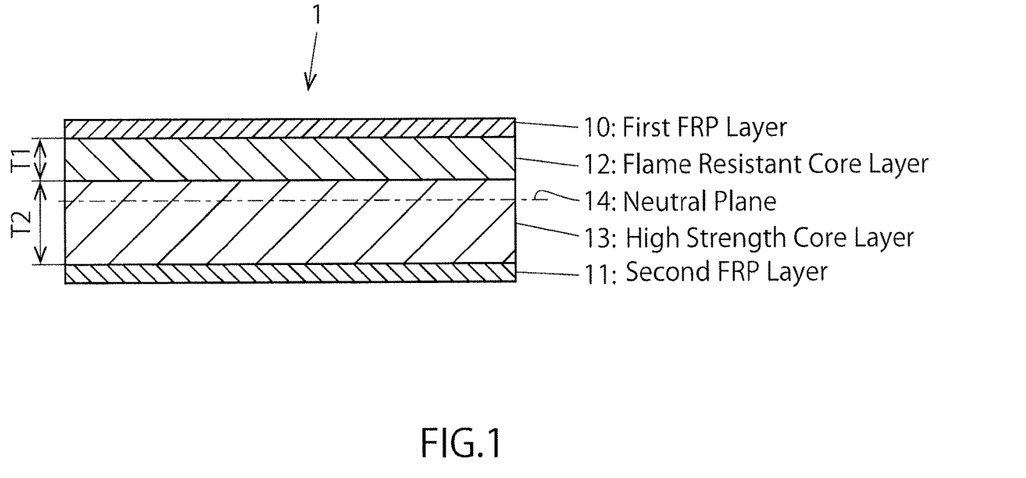
FIG. 1 is a longitudinal section view illustrating a laminated structure according to an embodiment of the present invention.

As illustrated in FIG. 1, a laminated structure 1 according to the embodiment comprises a first FRP layer 10 formed from a fiber reinforced plastic and a second FRP layer 11 formed from a fiber reinforced plastic and arranged opposed to the first FRP layer 10.

Note that, when using the laminated structure 1 for the front bodyshell of the front car of the high-speed railcar, the first FRP layer 10 is positioned to an external surface side of the front bodyshell of the front car and the second FRP layer 11 is positioned to an inner surface side of the front bodyshell of the front car when flame resistance is to be given to the external surface side of the front bodyshell, for example.

A flame resistant core layer (first core layer) 12 formed from a first resin foam is arranged between the first FRP layer 10 and the second FRP layer 11. A high-strength core layer (second core layer) 13 formed from a second resin foam is arranged between the flame resistant core layer 12 and the second FRP layer 11.

The first FRP layer 10 and the second FRP layer 11 may be formed using the same kind of fiber reinforced plastic or may be formed using different kinds of fiber reinforced plastics. It is preferable that they are formed using a thermosetting resin.

As materials of the fiber reinforced plastic, any kind of fibers can be used, such as carbon fibers, glass fibers, and aramid fibers. Also, any kind of method can be employed for weaving fibers, such as plain weave, twill weave, satin weave, unidirectional weave, nonwoven fabric, or the like.

Also, any kind of resin can be used for the fiber reinforced plastic, but it is preferable that the thermosetting resin with good fluidity is used therefor. Specifically, epoxy resin, unsaturated polyester resin, vinyl ester resin, phenol resin, bismaleimide resin, or the like is used.

Also, autoclave/prepreg molding which is a method of bagging or pressurizing and heating, oven curing prepreg molding, VaRTM, RTM, or the like can be employed as a method for molding the fiber reinforced plastic regardless of their kinds.

The first FRP layer 10 and the flame resistant core layer 12 are joined by a part of resin forming the first FRP layer 10. The second FRP layer 11 and the high-strength core layer 13 are joined by a part of resin forming the second FRP layer 11.

The flame resistant core layer 12 and the high-strength core layer 13 are joined by an adhesive, welding, fusing, or the like. Any kind of adhesive can join the both core layers 12, 13. Also, there is a method of joining the both core layers 12, 13 by making them in a dissolved state (state that the both core layer 12, 13 are dissolved into a solvent as a solute) to be joined as an example of welding, and there is a method of joining the both core layers 12, 13 by making then in a locally fused state with friction heat generated by vibrating the both core layers 12, 13 as an example of fusing. However, welding method and fusing method are not limited to them.

In the laminated structure 1 according to the embodiment, the first resin foam for forming the flame resistant core layer 12 has a higher flame resistance than the second resin foam for forming the high-strength core layer 13. For example, polyethylene terephthalate (PET) can be used for the first resin foam, and polyvinyl chloride (PVC) can be used for the second resin foam. Polymethacrylimide (PMI) can also be used as the first resin foam. However, PET is more advantageous than PMI in regards to cost.

It is preferable that the second resin foam for forming the high-strength core layer 13 has higher strength than the first resin foam for forming the flame resistant core layer 12. PVC and PMI of the above-mentioned materials have higher strength than PET.

Figure 2:
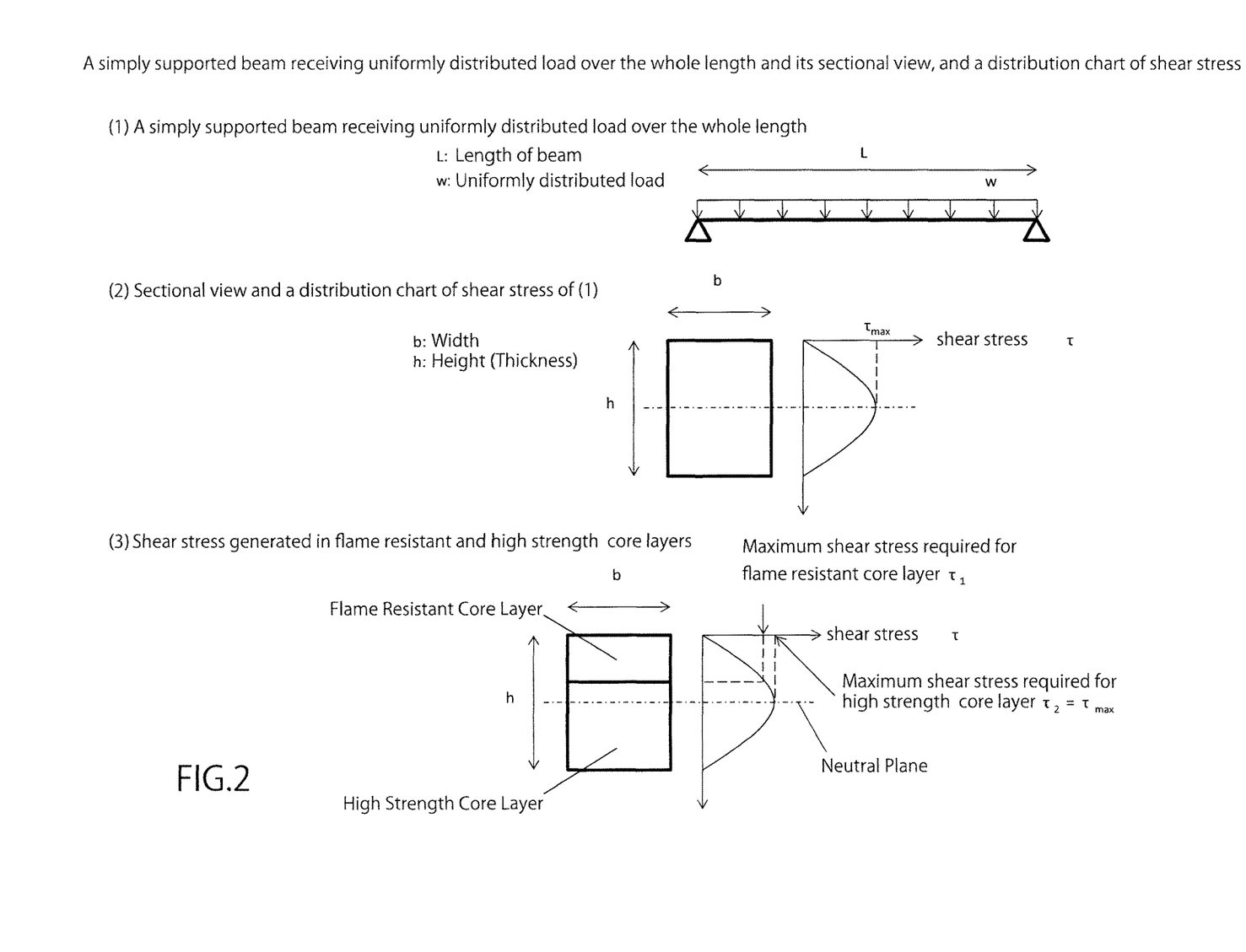
FIG. 2 illustrates a simply supported beam receiving uniformly distributed load over the whole length and its cross section view, and a distribution chart of shear stress.

As illustrated in FIG. 1, a thickness T2 of the high-strength core layer 13 is thicker than a thickness T1 of the flame resistant core layer 12. It can be seen from FIG. 2 that shear stress generated in a structure of a rectangular section becomes maximum in a neutral surface, and therefore shear stress necessary for the flame resistant core layer 12 can be reduced by arranging the flame resistant core layer 12 and the high-strength core layer 13 as mentioned above.

Namely, by the laminated structure 1 according to the embodiment, a core material configuring the laminated structure 1 has a two-layered structure composed of the flame resistant core layer 12 and the high-strength core layer 13, and therefore the flame resistant core layer 12 can take the flame resistant capacity and the high-strength core layer 13 can take the shear resistant strength, respectively.

Therefore, the laminated structure 1 having the flame resistance and the high-strength at the same time can be manufactured at a respectively low manufacturing cost.

Also, the thickness of the whole core layer can be thinner compared to a case that a core material excellent in flame resistance but inferior in strength is used to ensure a desired strength by increasing its thickness. Accordingly, manufacture becomes easy (it becomes easy to correspond to the form of a mold) and weight and cost can be reduced.

Also, in the laminated structure 1 according to the embodiment, a neutral plane 14 of shear stress is positioned in the impact resistant core layer 13, and therefore the maximum shear stress generated when an object (a bird, for example) collides with the laminated structure 1 can be taken by the high-strength core layer 13. Thereby, it can be surely prevented that a damage such as a crack is generated in the laminated structure 1 by an impact.

Note that, when using the laminated structure 1 for the front bodyshell of the front car of the high-speed railcar, the first FRP layer 10 is positioned to an external surface side of the front bodyshell of the front car and the second FRP layer 11 is positioned to an inner surface side of the front bodyshell of the front car when the flame resistance is to be given to the external surface side of the front bodyshell, for example.

In contrast, when the flame resistance is to be given to the internal surface side of the front bodyshell of the front car, arrangements of the first FRP layer 10 and the second FRP layer 11 are reversed.

Also, when the flame resistance is to be applied to the both external surface side and internal surface side of the front bodyshell of the front car, a laminated structure according to another embodiment of the present invention, which will be described below, can be used.

Hereunder, a laminated structure according to another embodiment of the present invention will be described referring to FIG. 3.

In a laminated structure 1A according to the embodiment, an additional flame resistant core layer (third core layer) 15 is arranged between the high-strength core layer 13 and the second FRP layer 11. Hereunder, the flame resistant core layer 12 on the first FRP layer 10 side is referred to as the first flame resistant core layer 12 and the flame resistant core layer 15 on the second FRP layer 11 side is referred to as the second flame resistant core layer 15.

The second flame resistant core layer 15 is formed from a resin foam having higher flame resistance than the second resin foam forming the high-strength core layer 13. The second flame resistant core layer 15 may be formed from the same kind of resin foam as the first flame resistant core layer 12 or may be formed from different kinds of resin foam.

In the laminated structure 1A according to the embodiment, the thickness T1 of the first flame resistant core layer 12 and a thickness T3 of the second flame resistant core layer 15 are the same. Components can be shared by forming the first flame resistant core layer 12 and the second flame resistant core layer 15 of the same material.

Also, the thickness T1 of the first flame resistant core layer 12 and the thickness T3 of the second flame resistant core layer 15 can be different. However, note that it is preferable that each layer thickness T1, T2, T3 is set so that the neutral plane 14 of shear stress is positioned in the high-strength core layer 13 in order to sufficiently secure the strength of the laminated structure 1A.

The second FRP layer 11 and the second flame resistant core layer 15 are joined by a part of resin forming the second FRP layer 11. The flame resistant core layer 13 and the second high-strength core layer 15 are joined by an adhesive, welding, fusing, or the like.

A kind of material which can be used as the first resin foam and the second resin foam is the same as that which is described on the laminated structure 1 in FIG. 1.

Also in the laminated structure 1A according to the embodiment, the same function and effect as the laminated structure 1 in FIG. 1 can be obtained. Further, the laminated structure 1A according to the embodiment comprises the flame resistant core layer 15 also on the second FRP layer 11 side, and therefore the flame resistance can be secured on the both sides of the laminated structure 1A.

Also, as the thickness T1 of the first flame resistant core layer 12 and the thickness T3 of the second flame resistant core layer 15 are the same, the laminated structure 1A can be used without distinguishing the outside and inside of the same, provided the both core layers 12 and 15 are formed from the same material.

Next, a laminated structure according to a variation of the embodiment in FIG. 3 will be described referring to FIG. 4.

In the laminated structure 1B, the thickness T1 of the first flame resistant core layer 12, the thickness T2 of the high strength core layer 13, and the thickness T3 of the second flame resistant core layer 15 are set to the same thickness.

A kind of material which can be used as the first resin foam and the second resin foam is the same as that which is described on the laminated structure 1 in FIG. 1.

Also in a laminated structure 1B according to the embodiment, the neutral plane 14 of shear stress is positioned in the high-strength core layer 13, and therefore the strength of the laminated structure 1B can be secured.

Also, as the thickness T1 of the first flame resistant core layer 12 and the thickness T3 of the second flame resistant core layer 15 are the same, the laminated structure 1B can be used without distinguishing the outside and inside of the same, provided the both core layers 12 and 15 are formed from the same material.

Next, a method of manufacturing a laminated structure according to an embodiment of the present invention will be described referring to FIG. 5. The manufacturing method according to the embodiment is a method for manufacturing the laminated structure 1 in FIG. 1.

Figure 5:
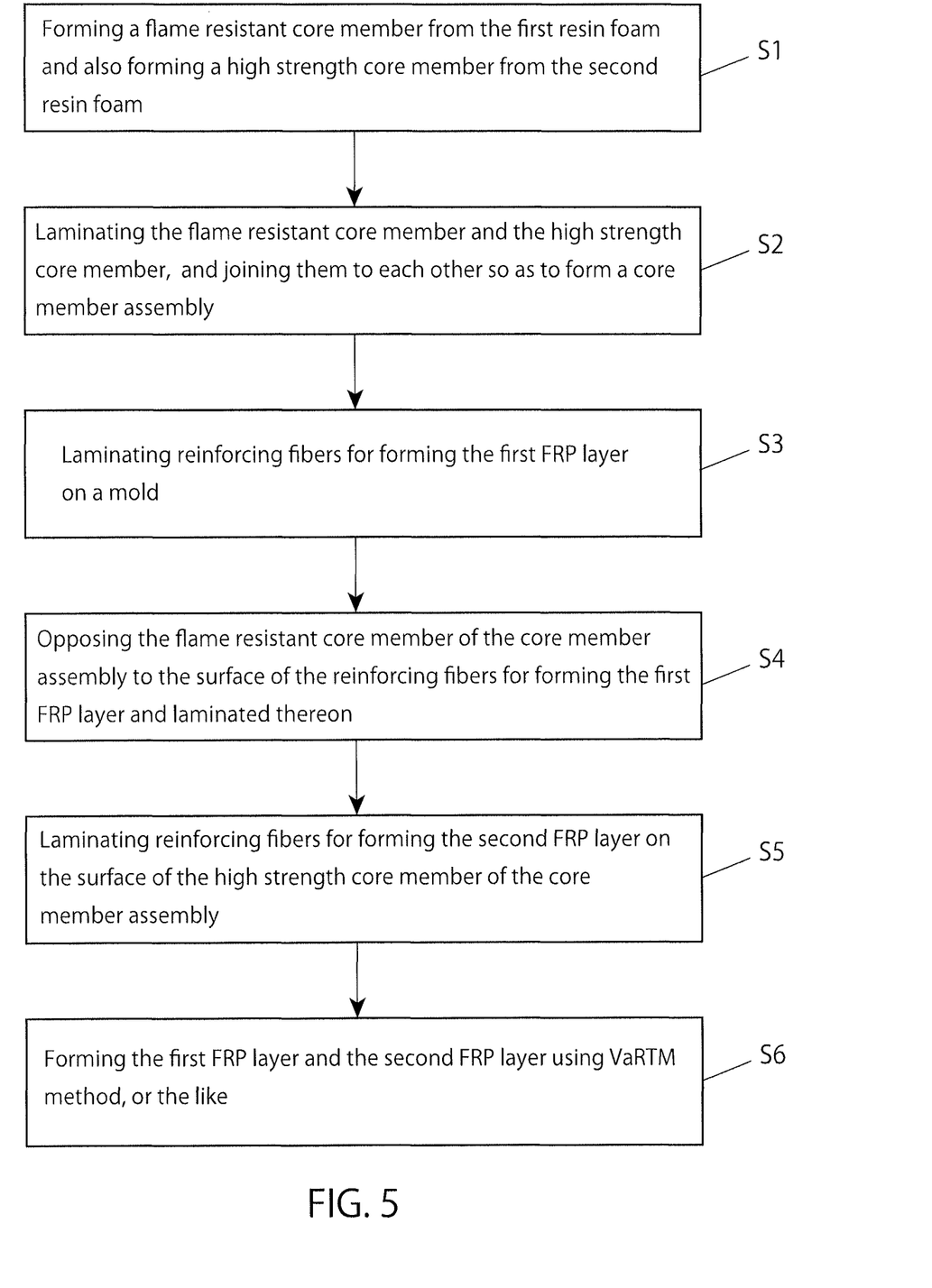
FIG. 5 is a flow chart illustrating a manufacturing method for manufacturing the laminated structure in FIG. 1.

As illustrated in FIG. 5, in the manufacturing method of the laminated structure 1 according to the embodiment, a flame resistant core member (corresponding to the flame resistant core layer 12) is formed from the first resin foam and also a high strength core member (corresponding to the high strength core layer 13) is formed from the second resin foam (step S1). For the first resin foam, a resin form whose flame resistance is higher than the second resin foam is used.

Next, the flame resistant core member and the high strength core member are laminated and they are joined to each other so as to form a core member assembly (step S2). The both core members are joined by an adhesive, welding, fusing, or the like.

Next, reinforcing fibers for forming the first FRP layer are laminated on a mold (step S3). Also, the flame resistant core member of the core member assembly is opposed to and laminated on the surface of the reinforcing fibers for forming the first FRP layer (step S4). Further, reinforcing fibers for forming the second FRP layer are laminated on the surface of the high strength core member of the core member assembly (step S5). Finally, the laminated structure 1 of FRP is formed using various FRP manufacturing methods such as autoclave molding, RTM, VaRTM, or the like (step S6).

Kinds of materials which can be used as the first resin foam and the second resin foam are the same as that which are already described on the laminated structure 1 in FIG. 1.

Next, a method of manufacturing a laminated structure according to another embodiment of the present invention will be described referring to FIG. 6. The manufacturing method according to the embodiment is a method for manufacturing the laminated structure 1A, 1B illustrated in FIG. 3 or FIG. 4.

Figure 6:
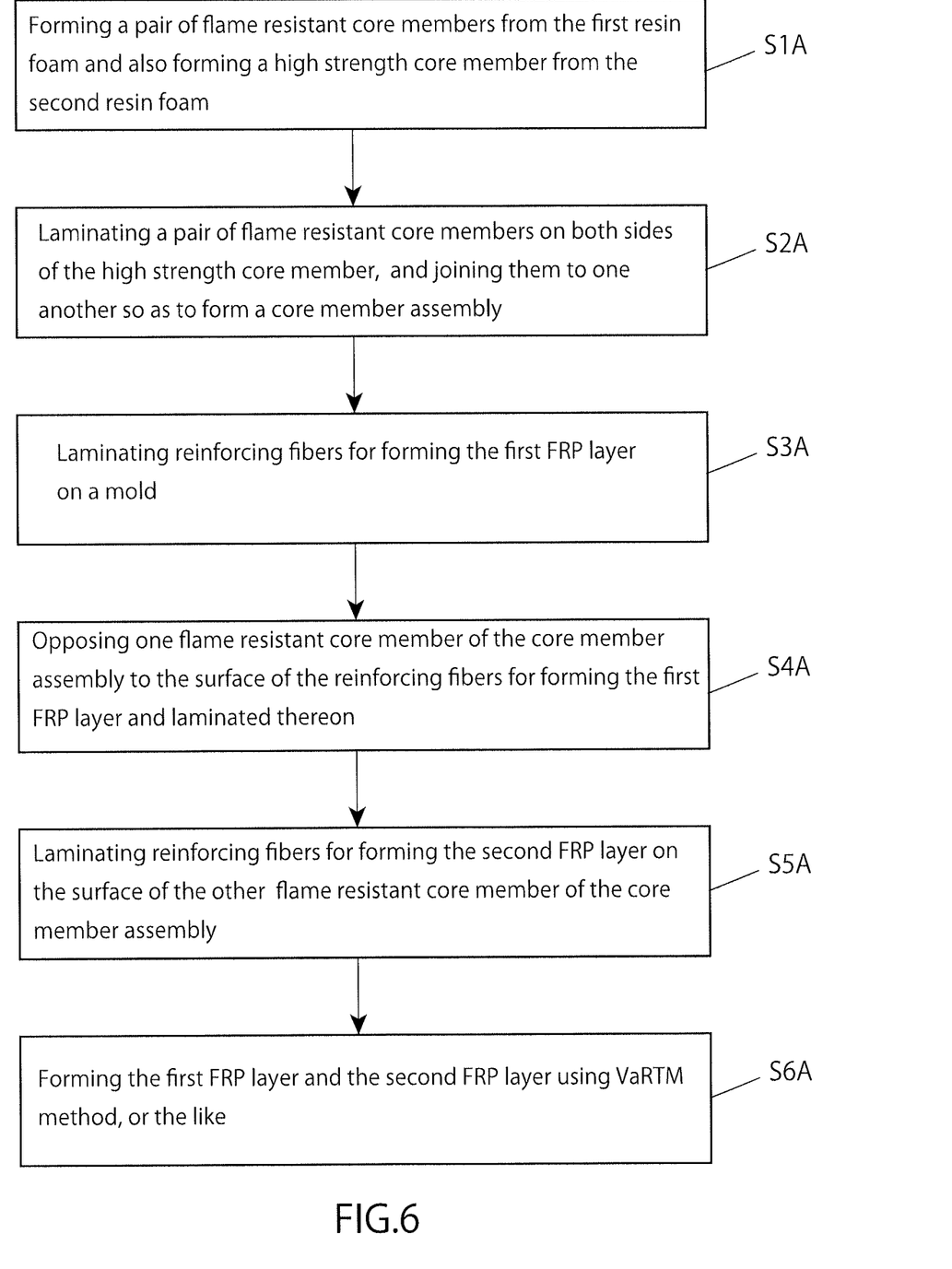
FIG. 6 is a flow chart illustrating a manufacturing method for manufacturing the laminated structure in FIG. 3 or FIG. 4.

As illustrated in FIG. 6, in the manufacturing method of the laminating structures 1A, 1B according to the embodiment, a pair of flame resistant core members (corresponding to the first combustion core layer 12 and the second combustion core layer 15) are formed from the first resin foam and also the high strength core member (corresponding to the high strength core layer 13) is formed from the second resin foam (step S1A). For the first resin foam, a resin form whose strength is higher than the second resin foam is used.

Next, the pair of flame resistant core members are laminated on the both sides of the high strength core member and joined to each other so as to form a core member assembly (step S2A). The core members are joined by an adhesive, welding, fusing, or the like.

Next, reinforcing fibers for forming the first FRP layer are laminated on a mold (step S3A). Also, one of the flame resistant core members of the core member assembly is opposed to and laminated on the surface of the reinforcing fibers for forming the first FRP layer (step S4A). Also, reinforcing fibers for forming the second FRP layer are laminated on the surface of the other of the flame resistant core members of the core member assembly (step S5A). Finally, the laminated structures 1A, 1B of FRP are formed using various FRP manufacturing methods such as autoclave molding, RTM, VaRTM, or the like (step S6A).

Figure 3:
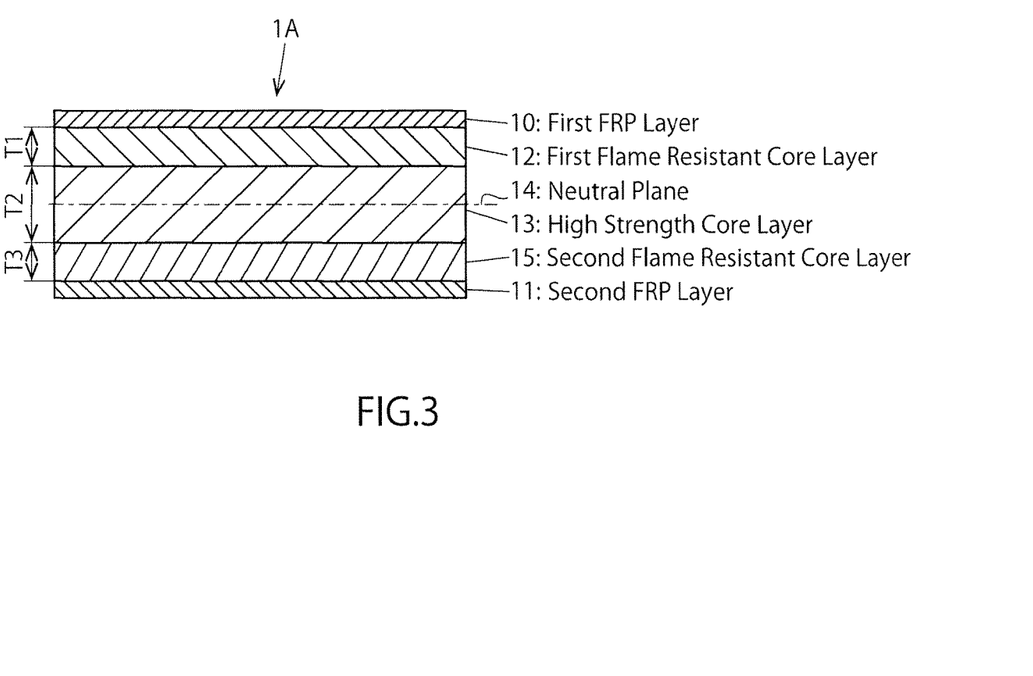
FIG. 3 is a longitudinal section view illustrating a laminated structure according to another embodiment of the present invention.
Figure 4:
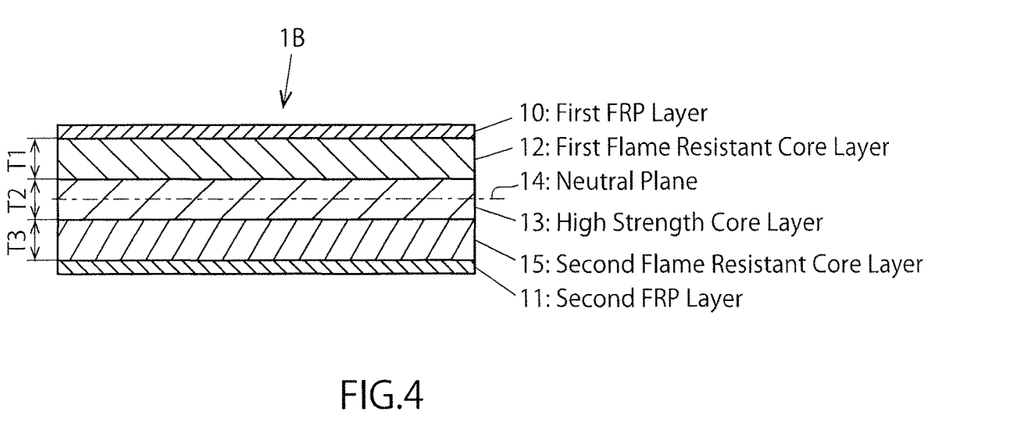
FIG. 4 is a longitudinal section view illustrating a laminated structure according to a variation of the embodiment in FIG. 3.

Kinds of materials which can be used as the first resin foam and the second resin foam are the same as that which are already described on the laminated structures 1A, 1B in FIG. 3 and FIG. 4.

REFERENCE SIGNS LIST 1, 1A, 1B . . . laminated structure
10 . . . first FRP layer
11 . . . second FRP layer
12 . . . flame resistant core layer (first flame resistant core layer)
13 . . . high strength core layer
14 . . . neutral surface of shear stress
15 . . . flame resistant core layer (second flame resistant core layer)

The invention claimed is:
1. A laminated structure comprising:
a first layer formed from a fiber reinforced plastic;
a second layer formed from a fiber reinforced plastic and arranged opposed to the first layer;
a first core layer formed from a first resin foam and arranged between the first layer and the second layer; and
a second core layer formed from a second resin foam and arranged between the first core layer and the second layer, wherein a thickness of the second core layer is thicker than a thickness of the first core layer,
wherein the first resin foam has a higher flame resistance than the second resin foam,
wherein the second resin foam has a higher strength than the first resin foam, and
wherein a neutral plane of shear stress is located within the second core layer.
2. The laminated structure according to claim 1, wherein the first core layer and the second core layer are joined.
3. The laminated structure according to claim 2, wherein the first core layer and the second core layer are joined by any one of bonding, welding, fusing, or any combination thereof.
4. The laminated structure according to claim 1, wherein the first layer and the first core layer are joined by a part of resin forming the first layer.
5. The laminated structure according to claim 1, wherein the second layer and the second core layer are joined by a part of resin forming the second layer.
6. The laminated structure according to claim 1, wherein a third core layer formed from a resin foam which has a higher flame resistance than the second resin foam is arranged between the second core layer and the second layer.

7. The laminated structure according to claim 6, wherein the second core layer and the third core layer are joined.

8. The laminated structure according to claim 7, wherein the second core layer and the third core layer are joined by any one of bonding, welding, fusing, or any combination thereof.

9. The laminated structure according to claim 6, wherein the second layer and the third core layer are joined by a part of resin forming the second layer.

10. The laminated structure according to claim 1, wherein the first resin foam is formed from any one of polyethylene terephthalate, phenol resin, or polyether sulfone.

11. The laminated structure according to claim 1, wherein the second resin foam is formed from any one of polyvinyl chloride, polymethacrylimide, polyimide, or polyetherimide.

12. The laminated structure according to claim 1, wherein the laminated structure is used as a structural member forming at least a part of a front bodyshell of a front car of a railway vehicle.

13. The laminated structure according to claim 1, wherein the fiber reinforced plastic is formed using a thermosetting resin.

14. A manufacturing method of a laminated structure, comprising:
forming a first core member from a first resin foam;
forming a second core member from a second resin foam;
forming a core member assembly by laminating the first core member and the second core member, wherein a thickness of the second core member is thicker than a thickness of the first core member;
laminating a reinforcing fiber for forming a first fiber reinforced plastic layer on a mold;
making the first core member side of the core member assembly opposite to a surface of the reinforcing fiber for forming the first fiber reinforced plastic layer so as to be laminated on the same surface; and
laminating a reinforcing fiber for forming a second fiber reinforced plastic layer on the second core member side of the core member assembly,
wherein the first resin foam has a higher flame resistance than the second resin foam and wherein the second resin foam has a higher strength than the first resin foam, and
wherein a neutral plane of shear stress is located within the second core member.

15. The manufacturing method of a laminated structure according to claim 14, further comprising a step of forming a third core member between the second core member and the second layer.

16. The manufacturing method of a laminated structure according to claim 14, wherein the first layer and the second layer, and a core member adjacent to the layers are joined by a part of resin forming each of the first layer and the second layer.

17. The manufacturing method of a laminated structure according to claim 14, wherein the fiber reinforced plastic is formed using a thermosetting resin.

* * * * *